United States Patent

Polly, Sr.

[15] 3,667,315
[45] June 6, 1972

[54] VEHICLE HANDLE BAR HEATER

[72] Inventor: Jack J. Polly, Sr., 2524 Silver Creek Drive, Franklin Park, Ill. 60131

[22] Filed: Feb. 10, 1971

[21] Appl. No.: 114,134

[52] U.S. Cl. .................................................74/551.8
[51] Int. Cl. .................................................B62k 21/12
[58] Field of Search .................74/551.9, 551.8, 551.1, 552

[56] References Cited

UNITED STATES PATENTS 1,454,314    5/1923    Cobus.................................74/552 X

FOREIGN PATENTS OR APPLICATIONS 413,236    4/1946    Italy.....................................74/551.9

Primary Examiner—William F. O'Dea
Assistant Examiner—F. D. Shoemaker
Attorney—Darbo, Robertson & Vandenburgh

[57] ABSTRACT

The tubular cross member defining the handle bar of a vehicle, such as a snowmobile, has cartridge heater elements in the tubular interior thereof. The wiring from the cartridge heater extends through the handle bar to the vehicle battery or other source of electricity and includes a heat control and electrical switches.

9 Claims, 1 Drawing Figure

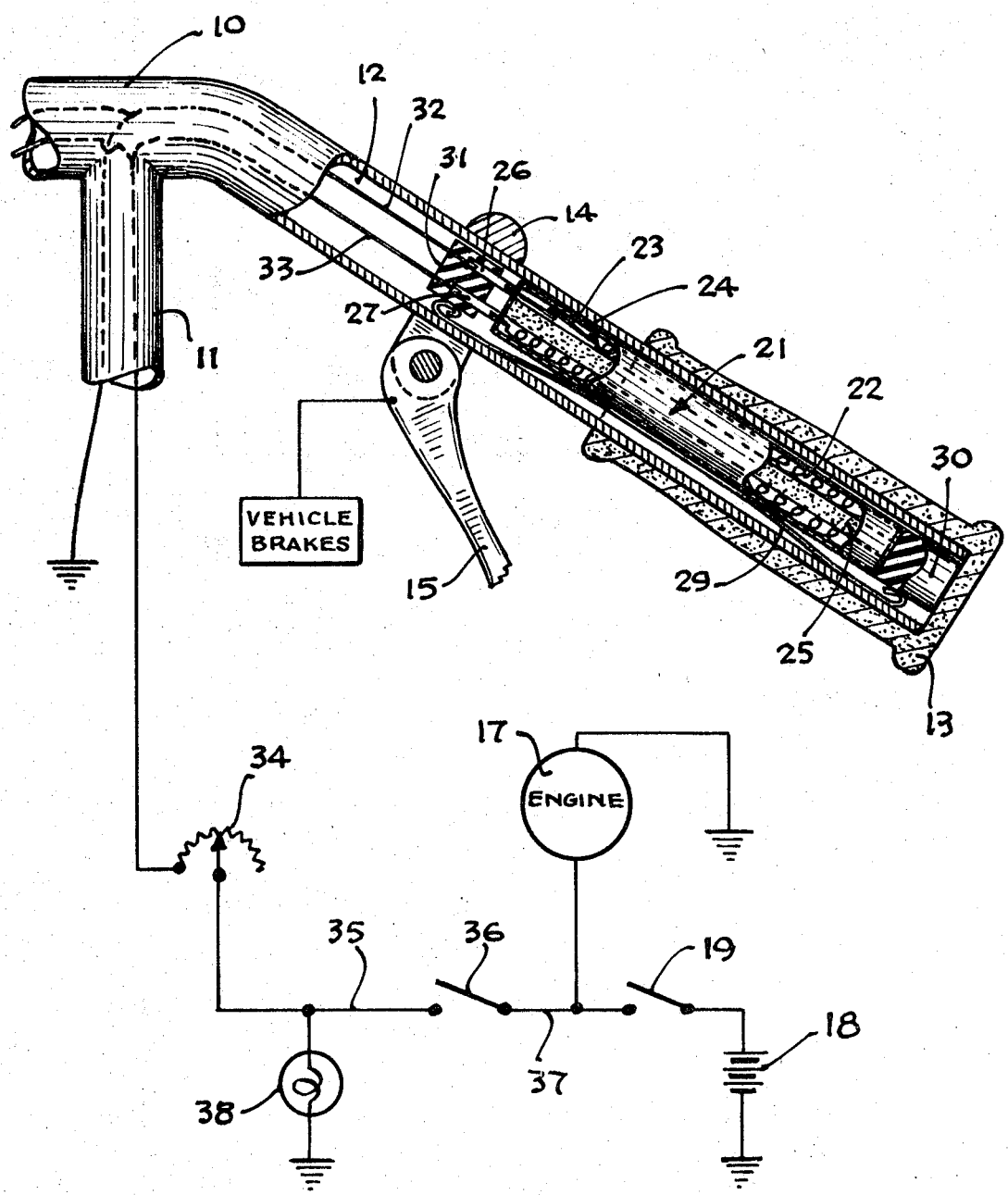

VEHICLE HANDLE BAR HEATER

BACKGROUND AND SUMMARY OF THE INVENTION

Snowmobiles will often be operated under conditions such that the "chill factor" to an individual is the equivalent of an extremely low temperature. For example, the snowmobile may be going 40 miles an hour with an ambient air temperature of 0° F. and the result is that the chill factor to the exposed rider corresponds to a temperature far below zero. While parts of the snowmobile may block the flow of air toward portions of the rider's body, this is not true of the hand area. Furthermore, the hands must remain relatively stationary in set positions at the end of the handle bar because of the necessity of holding the throttle advanced. Thus, absent stopping the snowmobile, the rider has no opportunity to warm or increase the circulation in the hands. Under such circumstances, even the best lined gloves are inadequate to adequately protect the rider's hands.

The present invention relates to an apparatus that will supply heat to the hands of the operator of such a vehicle.

DESCRIPTION OF THE DRAWING

The drawing illustrates a part of a snowmobile handle bar, partially in section, showing an embodiment of the invention and illustrates the wiring schematically.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The handle of a snowmobile or the like comprises a cross member 10 which is secured to an upright member 11. These members are tubular and define an internal opening 12. At each end of the cross member 10 are handgrips 13. These are likely to be affixed to a cross member 10 by means of set screws (not shown). Adjacent each of the handgrips are controls comprising a base 14 secured to the cross member and an arm 15 pivotally connected thereto. The arm 15 extends into the vicinity of the handgrip 13 in a manner such that it may be pivotally manipulated by the operator's hand while the hand is holding onto the grip. Such control at one end of the handle bar is connected (by means not shown) to operate the throttle of the vehicle motor and the control at the other end of the handle bar is operatively connected to operate the vehicle brakes.

Such vehicles will have a gasoline engine 17 electrically started by a battery 18 and controlled by an engine ignition switch 19.

As thus far described, the apparatus is conventional.

A cartridge heater 21 is inserted into opening 12 at each end of the handle bar. This cartridge heater includes a heating element 22 and a bimetal thermostat 23 in a case 24 and held in place in the case by a suitable filling material 25. Two leads 26 and 27 extend from the end of the case. A spring or shim 29 extends along one side of the case and holds the case against the opposite wall of the chamber 10. Insulating plugs 30 and 31 are positioned in opening 12 at each end of the cartridge heater. A wire 32 connects lead 26 to ground. A wire 33 connects lead 27 to a rheostat 34 serving as a heat control. A wire 35 connects rheostat 34 to an on-off switch 36. A wire 37 connects switch 36 to ignition switch 19. A pilot light 38 connects wire 35 to a ground.

A corresponding cartridge heater is similarly arranged in the other end (not shown) of the handle bar. Similarly heated handle grips could be provided for use by the riders of the vehicle in addition to the operator. These would be tubular elements with a cartridge heater inside.

With switch 19 closed and engine 17 operating, switch 36 can be closed to energize heater 21. The amount of electricity flowing to the heater can be controlled by suitable adjustment of rheostat 34. This will control the amount of heat put out by the cartridge heater. For use with a 12-volt direct current battery 18, I recommend the use of a 12- or 18-watt heater. This will supply an ample amount of heat for most installations. However, for extremely adverse conditions, a slightly higher wattage heater can be employed. Too much heat is undesirable because it is likely to have a deleterious effect on the material from which the grip 13 is made. Many of these grips are plastic and will not withstand excessive heat. To this end, I recommend the use of a cartridge heater having a bimetal thermostat 23 therein, although this is not absolutely necessary and, in some installations, the thermostat can be dispensed with. Likewise, in all embodiments, it is not necessary to use a heat control 34.

As earlier explained, in operating a snowmobile a person's hand must remain in a relatively fixed position about the grip 13. The pressure of the hand compresses the insulation in the gloves in the areas between the hand and the grip so that the insulation in that area is considerably less effective than in the areas of the glove where the hand is not applying pressure. Thus, there is a comparatively high ratio of heat transfer between the grip and those portions of the hand that are pressing against the grip. With a cold grip the hand is chilled that much more, but with the warm grip supplied by my invention the hand is warmed. Even just sufficient heat to prevent the loss of heat from the hand to the grip is a great improvement, although I recommend the use of more heat than that, i.e., sufficient heat to transfer heat to the hand.

This may be provided as a part of a vehicle or as an accessory item. By removing the grips at the ends of the handle bars it is a simple matter to insert the plugs 30, wires 32 and 33, and heater 21 into the open ends of the handle bar, with the wires being threaded through the opening 12 to a point at which it can exit. Grips 13 are replaced and fastened in place to close the ends of opening 12.

I claim:

1. In a handle bar for a motor driven vehicle such as a snowmobile or the like having a source of electric current where the handle bar includes an upright support member and a cross member connected thereto, such members defining a tubular opening within them, and a removable handgrip over the distal end of the cross member and covering the distal end of said opening, the combination therewith comprising:
    an encased tubular heating element of a cross-sectional size to be received in said opening, said element being in said opening adjacent said distal end; and
    wiring means connecting said element to said source and extending at least in part through said opening.

2. In the combination as set forth in claim 1, wherein said source is a battery and the vehicle has a gasoline engine connected to said battery through an ignition switch, said wiring means being connected to said battery through said ignition switch.

3. In the combination as set forth in claim 2, wherein said wiring means includes a rheostat for controlling the electricity flowing through said element and thereby controlling the temperature of the element.

4. In the combination as set forth in claim 3, wherein said heating element includes a thermostat within the case thereof.

5. In the combination set forth in claim 4 including insulating plugs in said opening at each end of said element.

6. In the combination set forth in claim 5 including means in said opening at one side of said element and holding the other side of said element against the adjacent portion of the cross member.

7. In the combination set forth in claim 1 including means in said opening at one side of said element and holding the other side of said element against the adjacent portion of the cross member.

8. In the combination set forth in claim 7 including insulating plugs in said opening at each end of said element.

9. In the combination as set forth in claim 1, wherein said wiring means includes a rheostat for controlling the electricity flowing through said element and thereby controlling the temperature of the element.

* * * * *